United States Patent
Park et al.

(10) Patent No.: US 10,635,163 B2
(45) Date of Patent: Apr. 28, 2020

(54) SYSTEM AND METHOD FOR INTERACTION ANALYSIS OF VIRTUAL SPACE

(71) Applicants: KOREA INSTITUTE OF SCIENCE AND TECHNOLOGY, Seoul (KR); CENTER OF HUMAN-CENTERED INTERACTION FOR COEXISTENCE, Seoul (KR)

(72) Inventors: Jung Min Park, Seoul (KR); Joong Jae Lee, Seoul (KR); Jeong Hwa Lee, Seoul (KR)

(73) Assignees: Korea Institute of Science and Technology, Seoul (KR); Center of Human-Centered Interaction for Coexistence, Seoul (KR)

( * ) Notice: Subject to any disclaimer, the term of this patent is extended or adjusted under 35 U.S.C. 154(b) by 0 days.

(21) Appl. No.: 16/170,202

(22) Filed: Oct. 25, 2018

(65) Prior Publication Data

US 2019/0163260 A1    May 30, 2019

(30) Foreign Application Priority Data

Nov. 29, 2017 (KR) ........................ 10-2017-0161427

(51) Int. Cl.
*G06F 3/01* (2006.01)

(52) U.S. Cl.
CPC .............. *G06F 3/011* (2013.01); *G06F 3/017* (2013.01)

(58) Field of Classification Search
CPC ............. G06F 3/01; G06F 3/011; G06F 3/017
See application file for complete search history.

(56) References Cited

U.S. PATENT DOCUMENTS

| 9,393,488 | B2 | 7/2016 | Brownlow et al. | |
| 2006/0089837 | A1* | 4/2006 | Adar | H04M 3/2227 705/309 |
| 2014/0181141 | A1* | 6/2014 | Sowell | G06F 16/245 707/769 |
| 2014/0270436 | A1* | 9/2014 | Dascal | G06T 7/11 382/130 |

(Continued)

FOREIGN PATENT DOCUMENTS

| KR | 2002-0012538 A | 2/2002 |
| KR | 10-2010-0035882 A | 4/2010 |

(Continued)

OTHER PUBLICATIONS

Haoran Liang et al., "Looking Into Saliency Model via Space-Time Visualization", IEEE Transactions on Multimedia, Nov. 2016, pp. 2271-2281, vol. 18, No. 11.

(Continued)

*Primary Examiner* — Robert J Michaud
(74) *Attorney, Agent, or Firm* — Rabin & Berdo, P.C.

(57) ABSTRACT

Provided is a system and method for interaction analysis of virtual space. The system for interaction analysis of virtual space includes an interaction data collection unit which collects interaction data of at least one user participating in virtual space in which virtual content is implemented, an interaction data storage unit which synchronizes and stores the collected interaction data, and an interaction data analysis unit which provides an analysis mode of the interaction data.

14 Claims, 7 Drawing Sheets

(56) References Cited

U.S. PATENT DOCUMENTS

2017/0095732 A1 4/2017 Ghaffari et al.
2017/0287225 A1 10/2017 Powderly et al.
2018/0336715 A1* 11/2018 Rickwald ................ G06T 13/40

FOREIGN PATENT DOCUMENTS

KR 10-1567995 B1 11/2015
WO WO 00/50974 A2 8/2000

OTHER PUBLICATIONS

Romain Vuillemot et al., "LIVVIL: Logging Interactive Visualizations and Visualizing Interaction Logs", IEEE VIS 2016 Conference, Baltimore, MD, USA, Oct. 23, 2016.
Erik Paluka et al., "SpatialVis: Visualization of Spatial Gesture Interaction Logs", LIVVIL: Logging Interactive Visualizations & Visualizing Interaction Logs, 2016.

* cited by examiner

SYSTEM AND METHOD FOR INTERACTION ANALYSIS OF VIRTUAL SPACE

CROSS-REFERENCE TO RELATED APPLICATION

This application claims priority to Korean Patent Application No. 10-2017-0161427, filed on Nov. 29, 2017, and all the benefits accruing therefrom under 35 U.S.C. § 119, the contents of which in its entirety are herein incorporated by reference.

STATEMENT REGARDING SPONSORED RESEARCH

This study was supported by the Global Frontier Project of Ministry of Science, ICT, Republic of Korea (Development of Hand-based Seamless CoUI (Coexistence User Interface) for Collaboration between Remote Users, Project No. 1711052648) under the Korea Institute of Science and Technology.

BACKGROUND

1. Field

The present disclosure relates to a system and method for interaction analysis of virtual space, and more particularly, to a system and method for storing and analyzing interaction of a user participating in one virtual space and interaction between such users.

2. Description of the Related Art

Recently, with the rapid development of computer technology and equipment along with the development of various types of products, users are experiencing various interactions that are different from earlier. Efficient and improved interaction between human and computer has been studied until now, and it is predicted that the field of Natural User Interface (NUI) allowing users to interact with 3-dimensional objects based on activities such as gestures in virtual space will continue to be developed in the future.

For research and development of user interfaces of virtual space, it is necessary to collect, store and analyze user interaction carried out in virtual space, but there has been little research and development of systems for storing and analyzing such interaction.

In virtual space in which a plurality of users participates, there is a need for a system and method for storing and analyzing not only interaction of each user but also interaction occurring between users.

SUMMARY

The present disclosure is designed to solve the above-described problem, and therefore the present disclosure is directed to providing a system and method for storing and analyzing not only interaction of each user but also interaction occurring between users in virtual space in which a plurality of users participates.

An interaction analysis system according to an embodiment of the present disclosure includes an interaction data collection unit which collects interaction data of at least one user participating in virtual space in which virtual content is implemented, an interaction data storage unit which synchronizes and stores the collected interaction data, and an interaction data analysis unit which provides an analysis mode of the interaction data.

In an embodiment, the interaction data may include a timestamp, a frame index, a real image, and a virtual space image.

In an embodiment, the interaction data may further include an interaction type and its confidence level, a user manipulation method, hand information, virtual object information and interaction information with another user.

In an embodiment, the interaction data may be collected in real time or for a set predetermined period of time.

In an embodiment, the collected interaction data may be stored with the time being synchronized by referring to a Network Time Protocol (NTP) server.

In an embodiment, the analysis mode may include a basic mode, a query mode and a statistics mode.

In an embodiment, the interaction data analysis unit may further provide an evaluation mode in which evaluation of the virtual content is performed based on the collected interaction data.

An interaction analysis method according to an embodiment of the present disclosure includes collecting interaction data of at least one user participating in virtual space in which virtual content is implemented, synchronizing and storing the collected interaction data, and providing an analysis mode of the interaction data.

In an embodiment, the interaction data may include a timestamp, a frame index, a real image and a virtual space image.

In an embodiment, the interaction data may further include an interaction type and its confidence level, a user manipulation method, hand information, virtual object information and interaction information with another user.

In an embodiment, the interaction data may be collected in real time or for a set predetermined period of time.

In an embodiment, the analysis mode may include a basic mode, a query mode and a statistics mode.

In an embodiment, the providing the analysis mode may include further providing an evaluation mode in which evaluation of the virtual content is performed based on the collected interaction data.

A tool that can collect and analyze various interactions occurring in virtual space can be provided to a virtual space manager or developer.

The virtual space manager or developer can easily perform analysis using the tool, and generate feedback information about virtual space based on the analyzed data.

That is, the system and method for interaction analysis of virtual space according to an embodiment of the present disclosure can be actively used in the research and development of user interfaces of virtual space.

DETAILED DESCRIPTION

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to locations or arrangements of individual elements in each disclosed embodiment without departing from the spirit and scope of the present disclosure. Accordingly, the following detailed description is not intended to be taken in limiting senses, and the scope of the present disclosure is only defined by the appended claims along with the full scope of equivalents to which such claims are entitled. In the drawings, similar reference signs denote identical or similar functions in many aspects.

The terms as used herein are general terms selected as those being now used as widely as possible in consideration of functions, but they may change depending on the intention of those skilled in the art, the convention or the emergence of new technology. Additionally, in certain cases, there may be terms arbitrarily selected by the applicant, and in this case, the meaning will be described in the corresponding description part of the specification. Accordingly, the terms as used herein should be interpreted based on the substantial meaning of the terms and the description throughout the specification, rather than simply the name of the terms.

The system for interaction analysis of virtual space according to the embodiments may have aspects of entirely hardware, entirely software, or partially hardware and partially software. For example, each "unit" that constitutes the system as used herein may collectively indicate hardware and operating software that enables the hardware to operate. Furthermore, hardware may be a data processing device including a computer processing unit (CPU) or other processor. Furthermore, software operated by hardware may indicate a process being executed, an object, an executable, a thread of execution, and a program.

Figure 1:
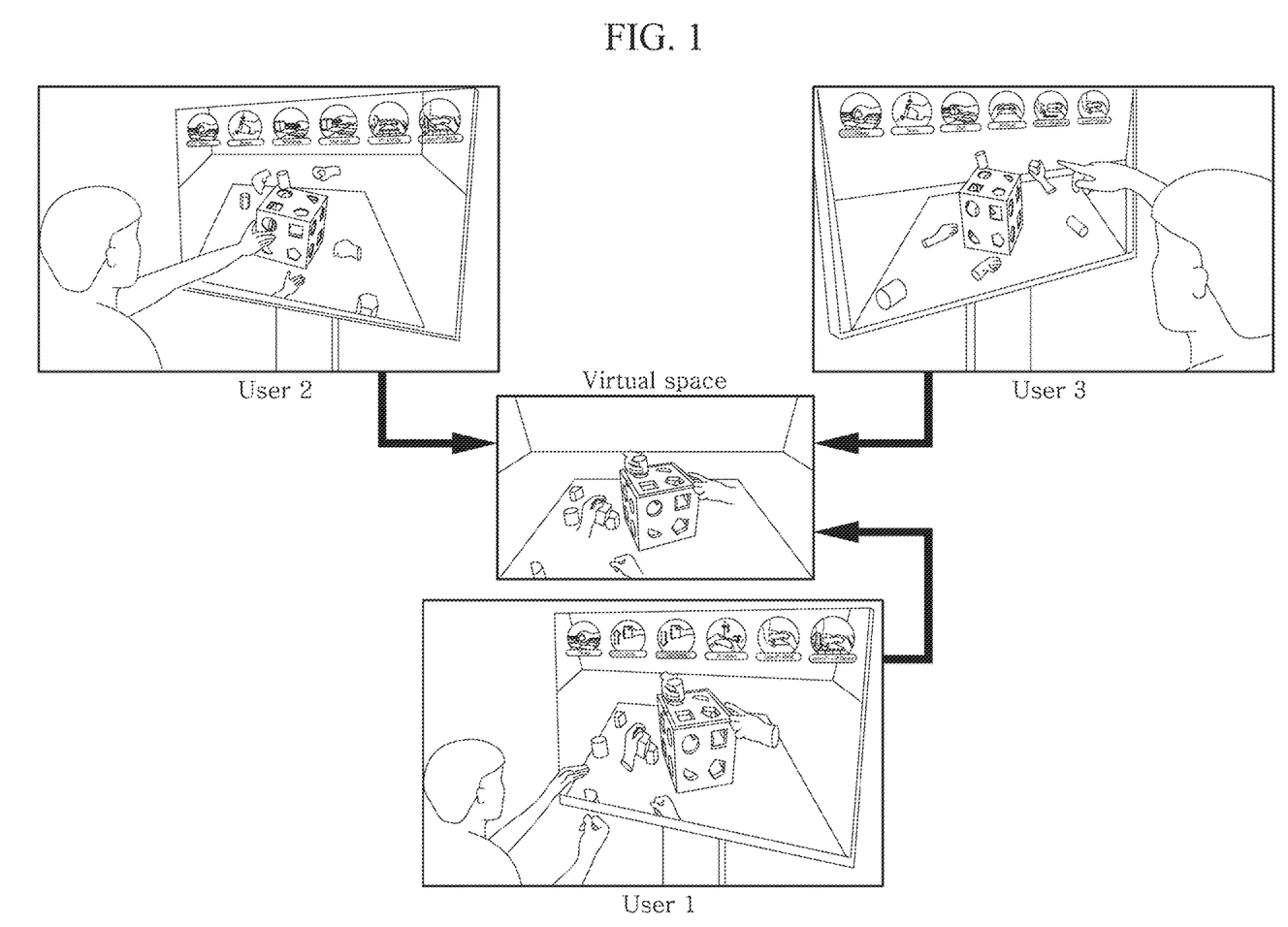
FIG. 1 is an exemplary diagram showing a virtual space according to an embodiment of the present disclosure.
Figure 2:
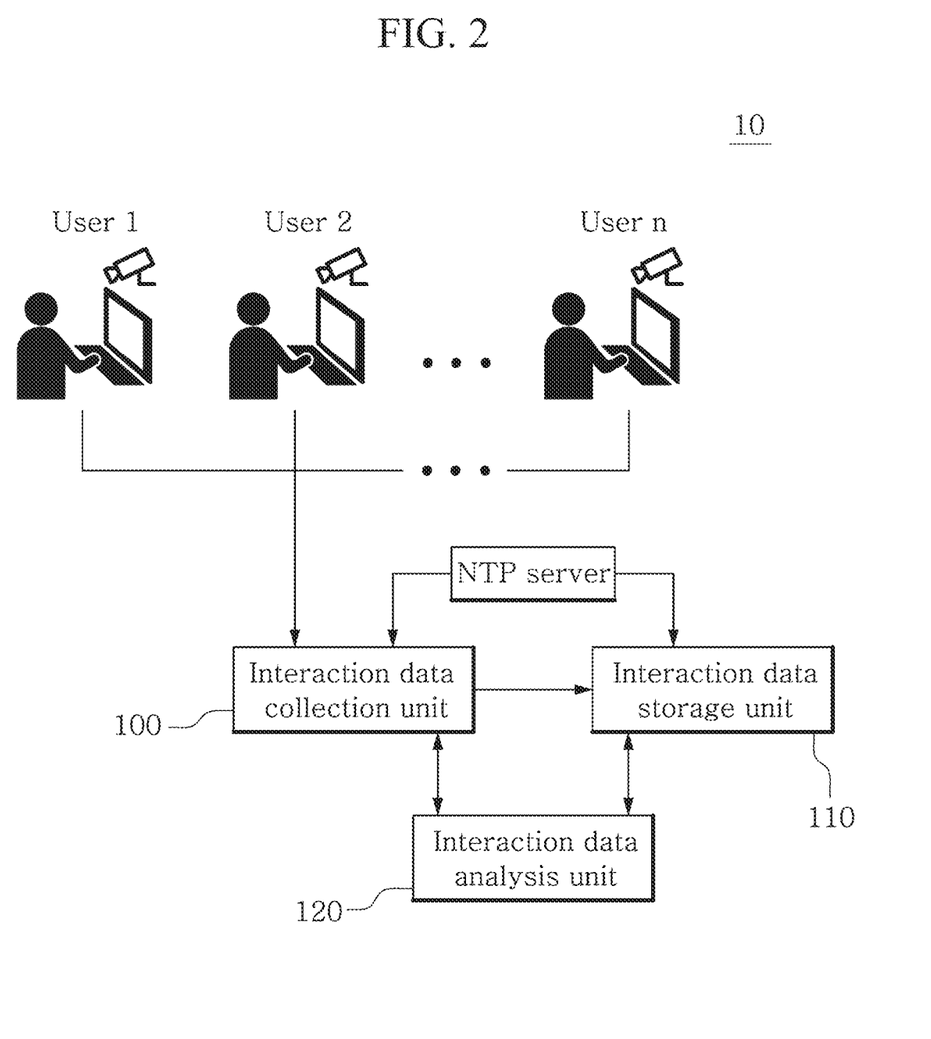
FIG. 2 is an architecture diagram of a system for interaction analysis of virtual space according to an embodiment of the present disclosure.

FIG. 1 is an exemplary diagram showing a virtual space according to an embodiment of the present disclosure, and FIG. 2 is an architecture diagram of a system for interaction analysis of virtual space according to an embodiment of the present disclosure.

Referring to FIG. 1, virtual space content that allows at least one user to participate may be implemented in virtual space. A plurality of virtual models having a predefined physical quantity may be implemented in virtual space. The virtual model may be implemented to make a physical motion mimicking the user's body part or a real object in virtual space.

The virtual space may be a space in which a block play using a virtual block can be done, but is not limited thereto, and the virtual space may be a game space in which a chess game can be played or a virtual office in which office work can be processed.

A plurality of users may participate in virtual space, and the users may interact with each other in virtual space. Here, interaction may refer to action affecting each other between at least one virtual object and at least one human.

The interaction that may occur in virtual space may be pre-classified into interaction type. The interaction type may be defined and classified as a minimum meaning unit of interaction. The interaction type refers to high-level abstract description that descripts interaction. The interaction type may include not only the level of recognition, but also other levels related to interpretation, intention and action. The interaction type does not simply represent interaction between a human and a virtual object occurring by recognizing the human's gesture, and may be defined as a meaningful action the human gives to the virtual object.

For example, the interaction type that may be defined when a user manipulates a particular object may include approach, withdraw, eye gaze, grasp, translation and rotation. Additionally, the interaction type that may be defined when a particular user gives an explanation to another user in virtual space may include pointing, ideograph and eye gaze.

The interaction type may be provided to the user as a user interface. An appropriate interaction type may be selected from interaction types provided by obtaining a user input such as the user's gesture and voice through a sensor and generating a recognition result of the user input through a plurality of algorithms. The recognition result of the user input may be represented as a confidence level of interaction type, and the interaction type to be applied may be determined according to the confidence level of interaction type. For example, when a confidence level value of grasp interaction type calculated as the recognition result of the user input is equal to or more than a preset reference value, the interaction corresponding to the user input may be selected as a grasp interaction type. The reference value may be adjusted by a virtual space manager or developer (hereinafter referred to as 'manager').

The interaction type may be displayed on the screen of virtual space in which the user participates like a sort of user interface. A plurality of interaction types may be configured and displayed at the upper part of the screen of virtual space. Here, the confidence value of each interaction type may be displayed as a bar-shaped gauge and the user can see the interaction type that is now activated in the current interaction. The interaction type may be differently configured depending on the environment of virtual space. Additionally, even though the plurality of users exists in the same virtual space all together as shown in FIG. 1, the interaction type may be differently configured depending on the user's preference.

Hereinafter, the system for interaction analysis of virtual space according to an embodiment of the present disclosure will be described in more detail.

Referring to FIG. 2, the system 10 for interaction analysis of virtual space according to an embodiment of the present disclosure includes an interaction data collection unit 100, an interaction data storage unit 110 and an interaction data analysis unit 120.

The system 10 for interaction analysis of virtual space according to the embodiments and each device or unit that constitutes the system may have aspects of entirely hardware, or partly hardware and partly software. For example, each component of the system 10 for interaction analysis of virtual space refers to a combination of hardware and software that runs by the corresponding hardware. The hardware may be a data processing device including a Central Processing Unit (CPU) or other processor. Additionally, the software that runs by the hardware may refer to a process in execution, an object, an executable, a thread of execution and a program. For example, the interaction data collection unit 100 may refer to a combination of hardware for collecting interaction data of virtual space and software that performs control to convert into the form of collected data.

The interaction data collection unit 100 may collect interaction data of a user participating in virtual space in which virtual content is implemented. The number of users participating in virtual space may be at least one, and the plurality of users may interact in the shared virtual space.

Here, interaction may include human-world interaction (or, human-object interaction) and human-human interaction. The user participating in virtual space may interact to manipulate a virtual object of virtual space through a user interface or may interact with another user of virtual space by doing a gesture using at least part of the body.

In this instance, at least part of the body (for example, a hand) of the user may be recognized through an input device such as a variety of known sensors including an image sensor such as a Leap Motion sensor and a camera, in particular, a RGBD sensor, and the recognized hand may be provided as input information and implemented as a virtual hand in virtual space. Additionally, the currently implemented virtual space may be outputted to the user through an output device such as a 3-dimensional display device or a head-mounted display device.

The input device and the output device may be provided to each user, each user may interact with each other in virtual space through the input device, and the virtual space reflecting interaction may be outputted to the users through the output device. The plurality of users may participate in virtual space using the above-described input device and output device in the same space, but is not limited thereto. The plurality of users corresponding to User 1 to User n shown in FIG. 2 may be located in different spaces, and may be connected via a network and participate in one virtual space.

The interaction data collected by the interaction data collection unit 100 may be data for analysis of such interaction. The interaction data may be data for analysis of interaction carried out in virtual space for a predetermined period of time. Here, the predetermined period of time may refer to a period of time from the start of the virtual space to the end of all tasks. As soon as the virtual space is implemented, the manager may collect interaction data carried out in virtual space in real time until the provision of the virtual space is finished. However, the predetermined period of time is not limited thereto, and it is a period of time during which a particular interaction is carried out, and may be a period of time set by the manager that intends to perform a particular interaction analysis.

The interaction data may include a timestamp corresponding to the predetermined period of time. The timestamp may include information corresponding to the start time and the end time of the predetermined period of time.

Additionally, the interaction data may include a virtual space image and a real image.

The virtual space image corresponds to an image of virtual space outputted through the output device for the predetermined period of time. The interaction data collection unit 100 may collect the virtual space image outputted to each user for each user. When the plurality of users participates in virtual space, the interaction data may be collected for each user. That is, the virtual space image collected from User 1 may be different from the virtual space image collected from User 2.

The real image may be an image of the body part of the user implemented in virtual space through the input device for the predetermined period of time. For example, the real image may be an image of the user's hand, but is not limited thereto. The real image may be also collected for each user participating in virtual space, and the real image collected from User 1 may be different from the real image collected from User 2.

The virtual space image and the real image may be generated and collected according to a preset frame, and the interaction data may include a frame index. The frame index may be information associated with the total number of frames and the time in which each frame is displayed, considering a frame in which the virtual space image and the real image are generated.

The interaction data may further include information associated with an interaction type, a confidence level of interaction type, a user manipulation method and a virtual object.

The information associated with interaction type includes information associated with an interaction type provided as an interface in the corresponding virtual space. Additionally, the information associated with interaction type includes information associated with an interaction type recognized in each time unit for the predetermined period of time. The confidence level of interaction type corresponds to information associated with a confidence level value of interaction type recognized in each time unit. The information associated with a virtual object may include, in particular, information associated with a virtual object with which the user interacts. Additionally, when User 1 interacts with User 2 like lifting an object together or giving instructions, the interaction data may include user information (for example, information of User 2 on the basis of User 1) that carries out interaction together and information associated with the interaction carried out.

The interaction data collected by the interaction data collection unit 100 may be provided to the interaction data storage unit 110.

The interaction data storage unit 110 may store each of the collected interaction data. However, the interaction data collected for each user may differ in the time collected depending on the environmental condition of each user, so time synchronization may be necessary for each of the collected interaction data. The synchronized interaction data, in which the times of the interaction data collected for each user are consistent, allows comparison and analysis of interaction occurring between the users.

Here, the interaction data collection unit 100 may include a plurality of clients corresponding to each of the plurality of users, the interaction data storage unit 110 may be a storage server, and the interaction data collection unit 100 and the interaction data storage unit 110 may be synchronized by referring to a Network Time Protocol (NTP) server. The synchronized data of each client may be stored in the interaction data storage unit 110 to form a database. The interaction data collection unit 100 may store the interaction data for each user, and may subdivide and store the interaction data according to the type of interaction data.

The interaction data analysis unit 120 may provide an analysis mode for analysis of the stored interaction data. Specifically, the interaction data analysis unit 120 may execute an applied program that provides the analysis mode as per the manager's command, and provide it to the manager.

The interaction data analysis unit 120 may load the interaction data for analysis from the interaction data storage unit 110. That is, the interaction data analysis unit 120 may provide an analysis mode for analyzing the existing stored interaction data. The range of the loaded interaction data may be determined by the user or the manager.

However, the interaction data analysis unit 120 is not limited thereto, and may also provide an analysis mode in which the interaction data collected by the interaction data collection unit 100 may be monitored and analyzed in real time. That is, the synchronized interaction data may be provided to not only the interaction data storage unit 110 but also the interaction data analysis unit 120.

The interaction data analysis unit 120 may be connected to the interaction data storage unit 110 and the interaction data collection unit 100 via a network online or offline.

The analysis mode of the interaction data analysis unit 120 may include a basic mode, a query mode and a statistics mode.

The basic mode may be a basic display on which the loaded interaction data is displayed to the manager. The type of interaction data displayed in the basic mode may be preset by the manager that performs analysis, and the manager may arbitrarily adjust the type of data displayed.

The query mode is provided in which the manager searches for interaction data in a specific condition. That is, the manager may query only interaction data satisfying the specific condition through the query mode.

The statistics mode provides statistical analysis based on interaction data. That is, the manager may perform statistical analysis of interaction data through the statistics mode.

The interaction data analysis unit 120 may provide a function of loading the interaction data stored in the interaction data storage unit 110 and freely performing query, a function of inputting a condition and performing a selective search for only specific interaction data and a function of performing statistical analysis of the found interaction data.

The analysis mode of the interaction data analysis unit 120 may be performed for each user, but is not limited thereto, and in some embodiments, a mode may be provided in which data of the plurality of users is loaded together and displayed on one display and a comparative analysis is performed.

Additionally, the interaction data analysis unit 120 may further provide an evaluation mode. Here, the evaluation mode is a mode in which evaluation of the virtual content provided in virtual space is performed based on the collected interaction data. For example, the evaluation mode may be provided in which evaluation is performed on the currently collected interaction data with respect to a reference value preset for each item. Additionally, the evaluation mode may include evaluation as to how accurate the interaction type provided in virtual space is, whether it is suitable for the user, or whether it reflects the user's preference.

Hereinafter, the embodiments of the interaction data analysis unit 120 will be described in more detail with reference to FIGS. 3 to 6.

Figure 3:
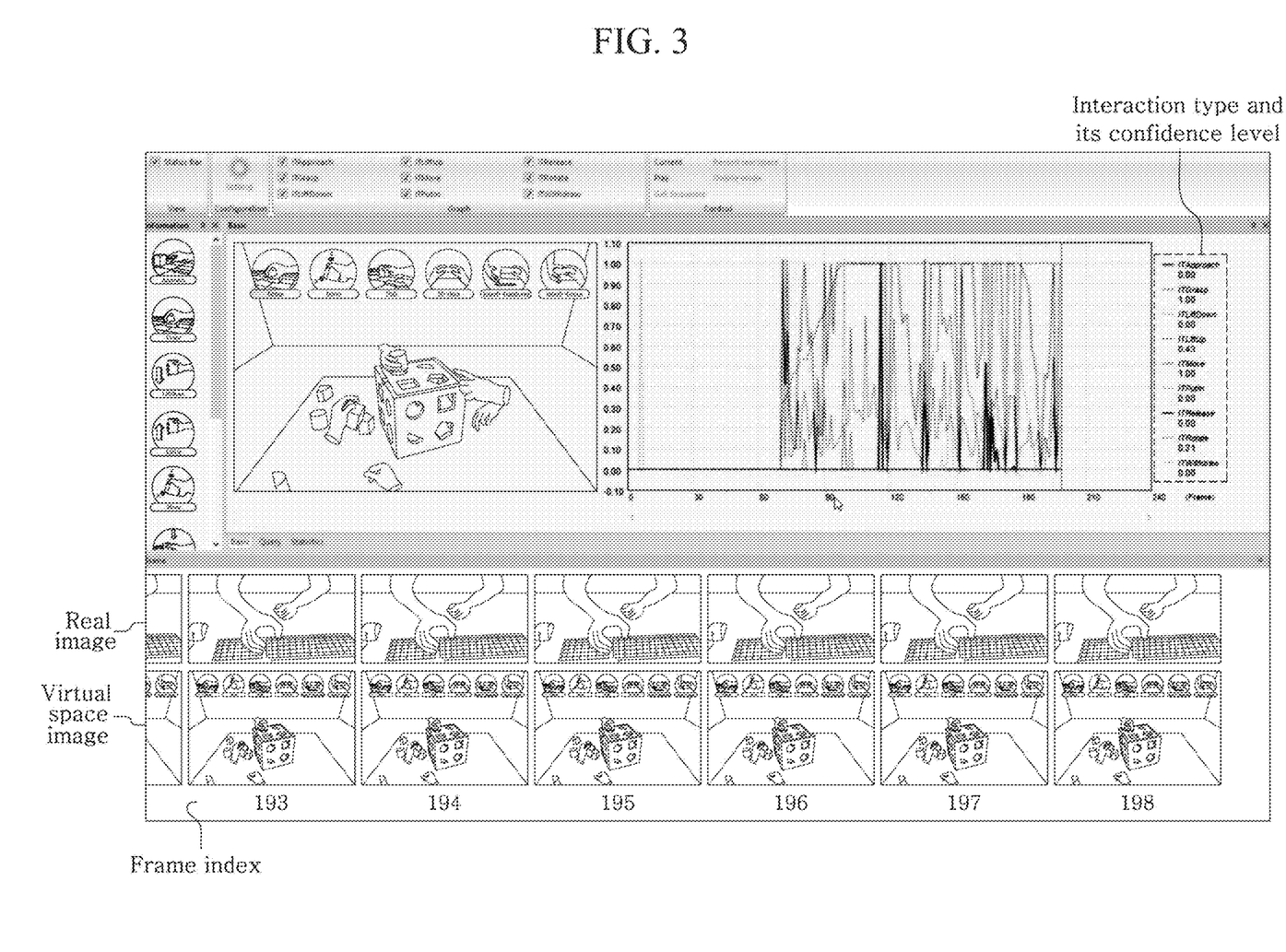
FIG. 3 is an exemplary diagram showing a basic mode provided by an interaction data analysis unit according to an embodiment of the present disclosure.
Figure 4:
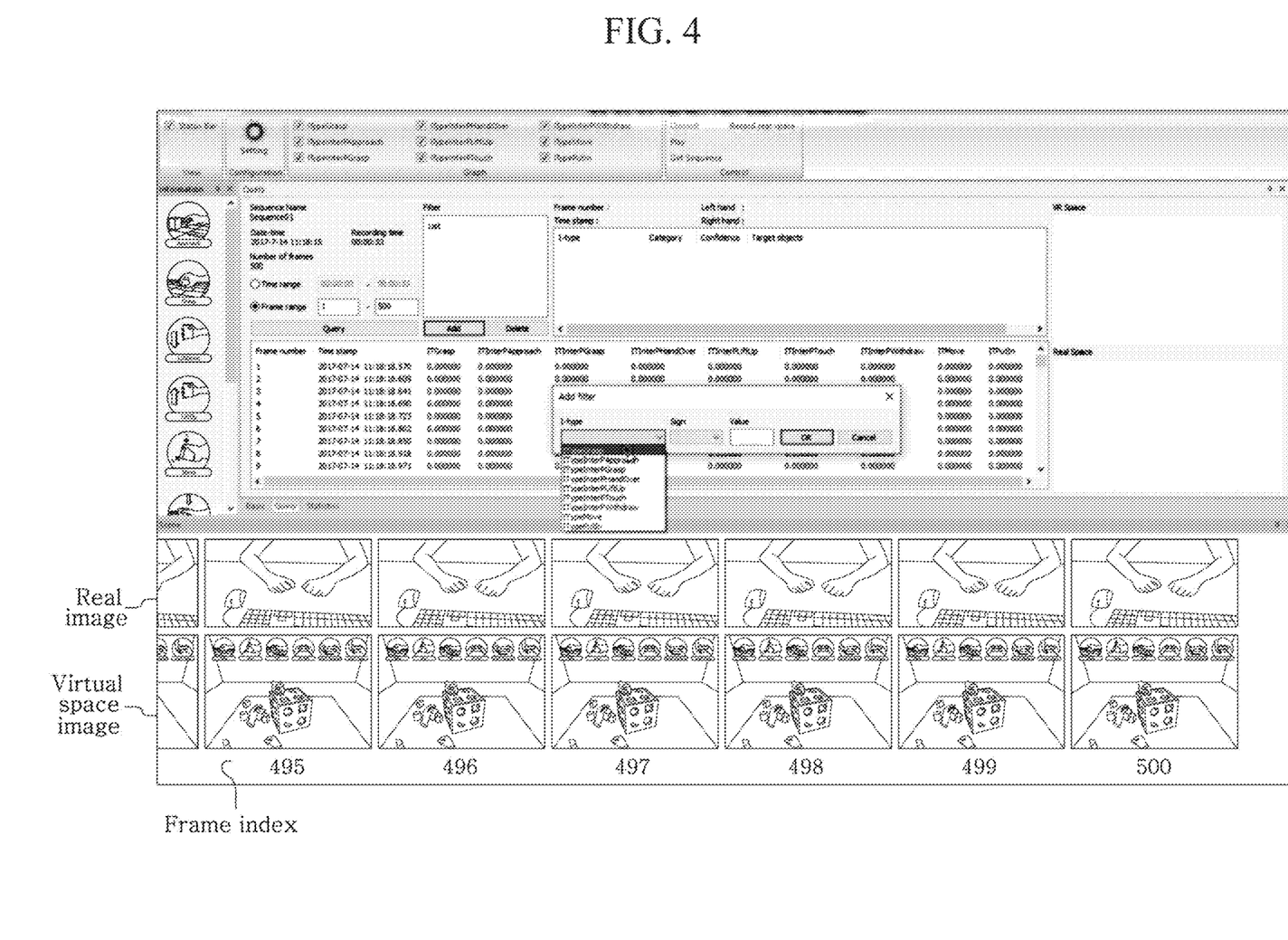
FIGS. 4 and 5 are exemplary diagrams showing a query mode provided by an interaction data analysis unit according to an embodiment of the present disclosure.
Figure 5:
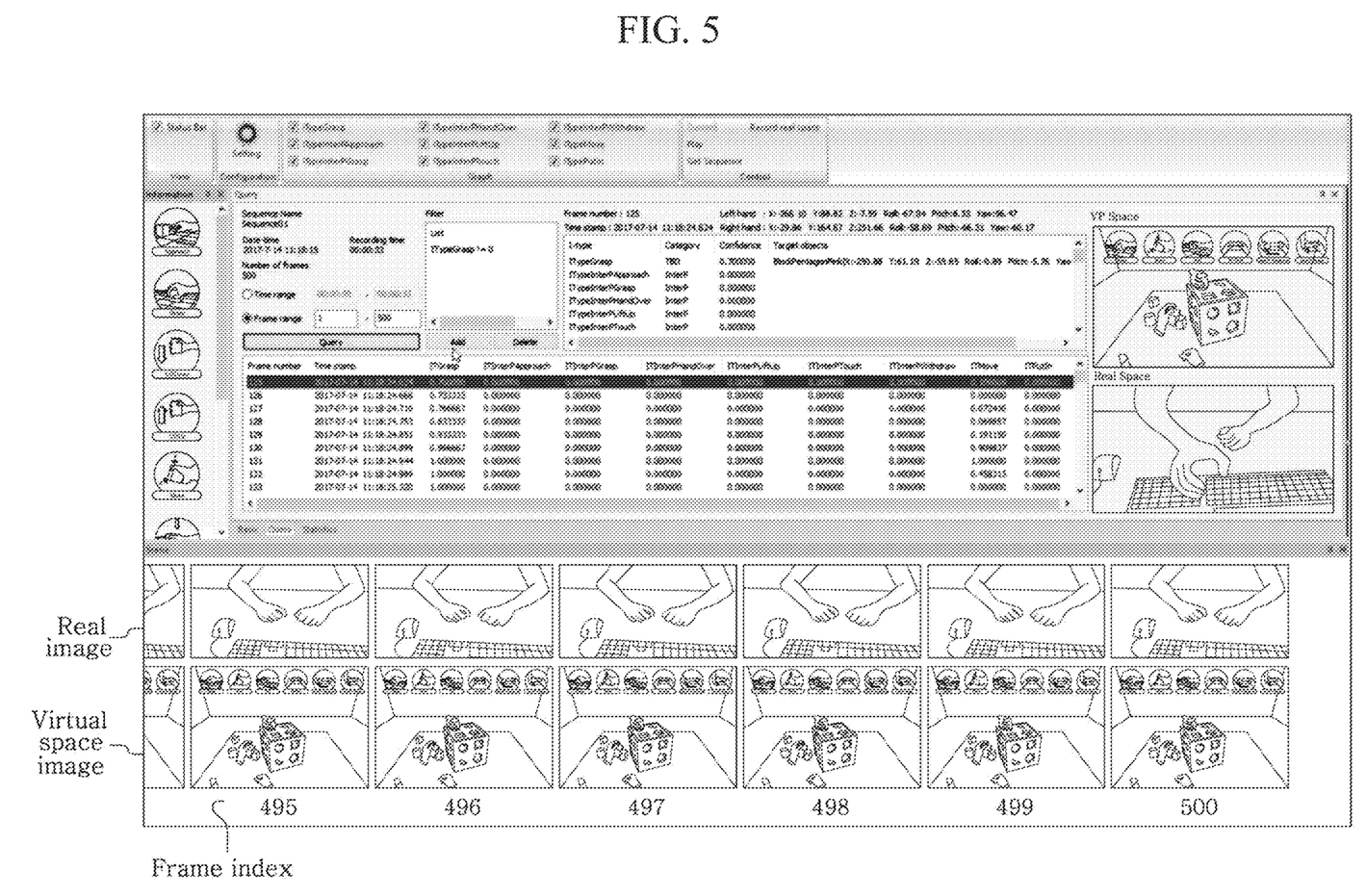
Figure 6:
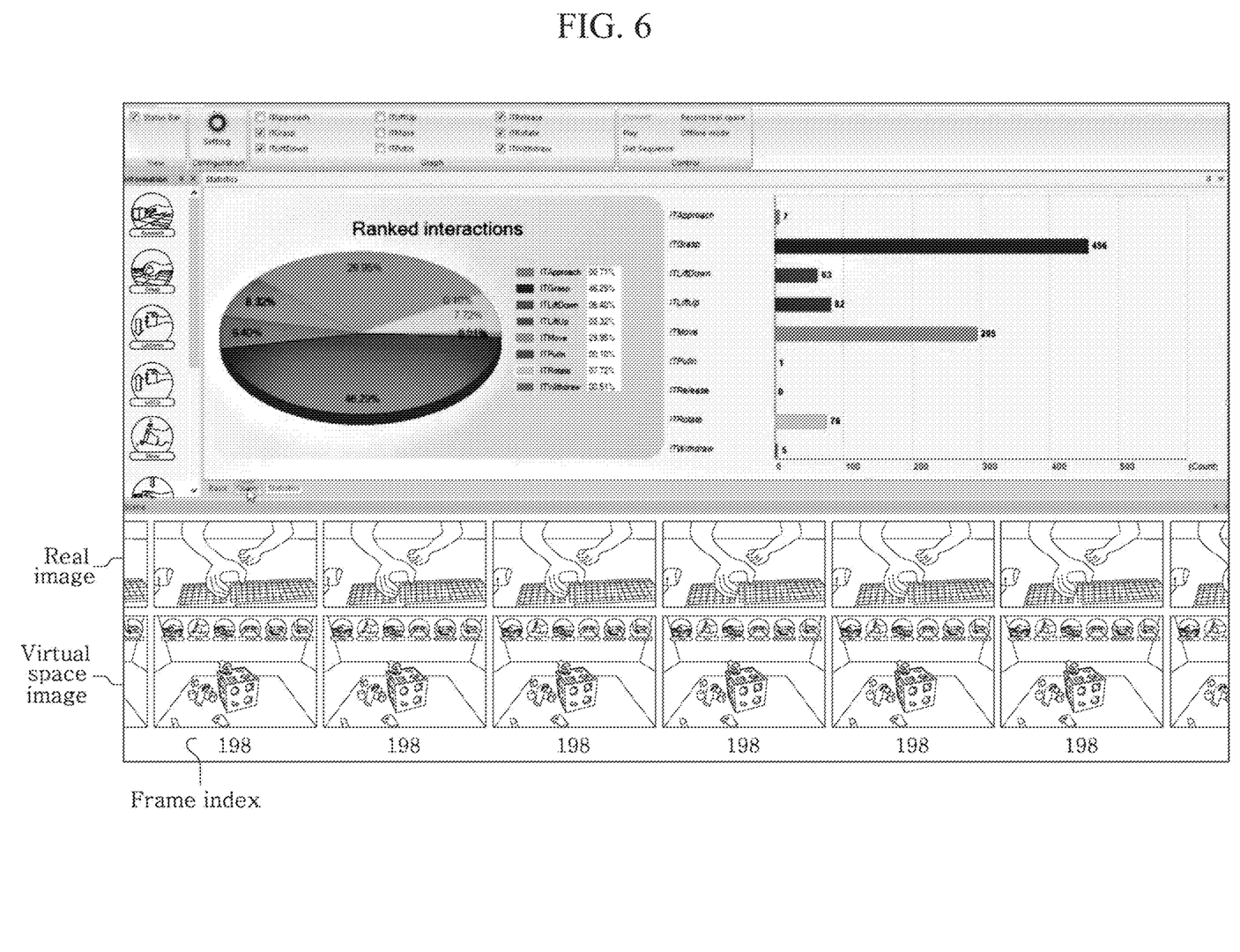
FIG. 6 is an exemplary diagram showing a statistics mode provided by an interaction data analysis unit according to an embodiment of the present disclosure.

FIG. 3 is an exemplary diagram showing the basic mode provided by the interaction data analysis unit 120, FIGS. 4 and 5 are exemplary diagrams showing the query mode provided by the interaction data analysis unit 120, and FIG. 6 is an exemplary diagram showing the statistics mode provided by the interaction data analysis unit 120.

The basic mode may enable check for the interaction data loaded from the interaction data storage unit 110. The loaded interaction data may be arranged side by side throughout all frames according to the frame index. The virtual space images and real images corresponding to the time of each frame may be arranged in a sequential order according to the frame index. Additionally, information associated with the selected interaction type corresponding to the frame and its confidence level value may be displayed. Additionally, the virtual space image of the currently selected frame may be magnified and displayed. The manager may see the virtual space image and the real image on the basis of the particular frame, and information associated with the interaction type activated in virtual space in the corresponding frame and its confidence level value through the basic mode. That is, the manager may see if the user's action done in the real image is reflected on the virtual space through the virtual space image, and the confidence level value of interaction type corresponding to the user's action. The display of interaction data shown in FIG. 3 is for illustration only, and the type and configuration of interaction data displayed is not limited thereto.

The manager may select the query mode, set a specific condition, and query a result value satisfying the corresponding condition. As shown in FIG. 4, the manager may query a frame having a confidence level value of a particular interaction type (for example, a grasp interaction type) within the set frame range that is equal to or more than the inputted numerical value, and as shown in FIG. 5, the search result may be provided to the manager. Additionally, in some embodiments, the manager may query a frame in which collaboration with another user takes place, and perform detailed analysis of a situation in which collaboration with another user takes place.

The manager may select the statistics mode, and generate a statistical graph based on the rating of interaction type occurred in a particular time range or frame range as shown in FIG. 6. Additionally, the search results in the query mode may be provided to the manager as a graph through the statistics mode.

The system 10 for interaction analysis of virtual space according to an embodiment of the present disclosure may provide the virtual space manager with a tool that can collect and analyze various interactions occurring in virtual space. The virtual space manager may easily perform analysis using the tool, and generate feedback information about virtual space based on the analyzed data. For example, as a result of analysis, when a particular interaction type is recognized too frequently or recognition is not easily performed, the virtual space manager may generate feedback information for adjusting the reference value of the confidence level value for each interaction type. Additionally, when in the real image, action occurring between users is not appropriately reflected on the virtual space, a new interaction type may be developed and provided to the virtual space.

That is, the system 10 for interaction analysis of virtual space according to an embodiment of the present disclosure may be actively used in the research, development and evaluation of user interfaces of virtual space.

Hereinafter, a method for interaction analysis of virtual space according to an embodiment of the present disclosure will be described.

Figure 7:
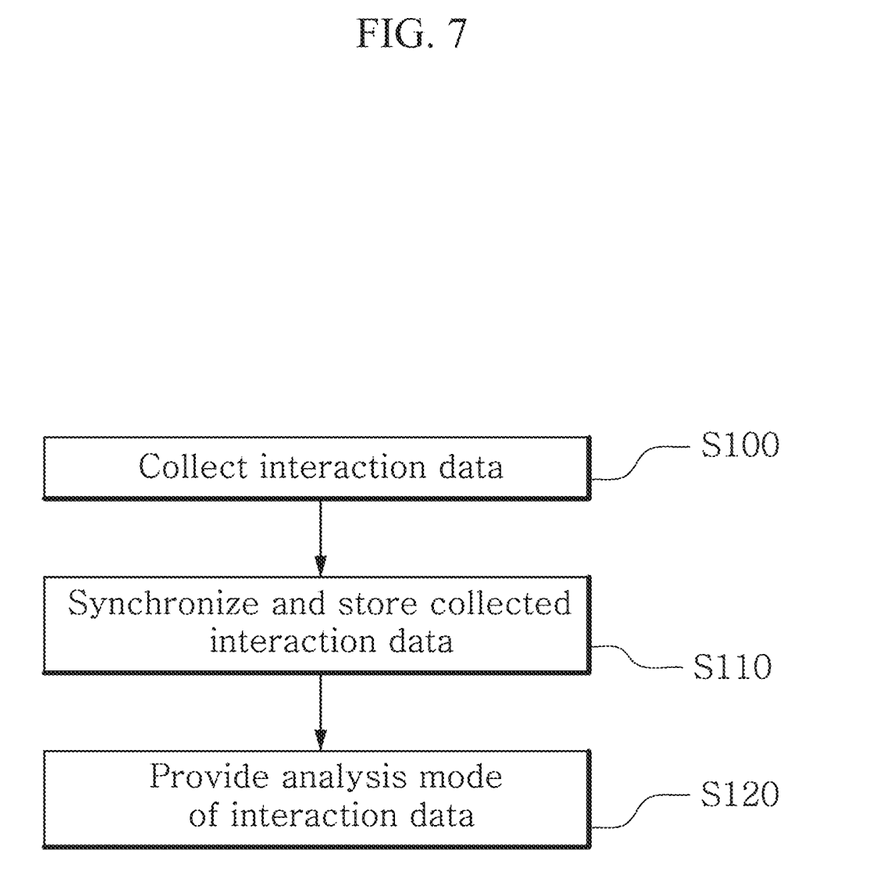
FIG. 7 is a flowchart of a method for interaction analysis of virtual space according to an embodiment of the present disclosure.

FIG. 7 is a flowchart of the method for interaction analysis of virtual space according to an embodiment of the present disclosure.

Referring to FIG. 7, the method for interaction analysis of virtual space according to an embodiment of the present disclosure includes collecting interaction data (S100), synchronizing and storing the collected interaction data (S110), and providing an analysis mode of the interaction data (S120).

Here, a system for interaction analysis of virtual space that performs each of the above-described steps may be the above-described system 10 for interaction analysis of virtual space of FIG. 2, and its detailed description is omitted herein.

First, interaction data is collected (S100).

The step (S100) of collecting interaction data includes collecting interaction data of a user participating in virtual space in which virtual content is implemented. The number of users participating in virtual space may be at least one, and the plurality of users may interact with each other in virtual space. The interaction data may be data for analysis of such interaction. The interaction data may be data for analysis of interaction carried out in virtual space for a predetermined period of time. Here, the predetermined period of time may refer to a period of time from the start of the virtual space to the end of all tasks. However, the predetermined period of time is not limited thereto, and it is a period of time during which a particular interaction is carried out, and may be a period of time set by the manager that intends to perform a particular interaction analysis.

The interaction data may include a timestamp corresponding to the predetermined period of time, a virtual space image and a real image. The interaction data may further include information associated with an interaction type, a confidence level of interaction type, a user manipulation method, and a virtual object, and when User 1 interacts with User 2 such as lifting an object together or giving instructions, the interaction data may also include user information (for example, information of User 2 on the basis of User 1) that carries out interaction together and information associated with the interaction carried out. The collection of the interaction data may be performed by the interaction data collection unit.

Subsequently, the collected interaction data is synchronized and stored (S110).

The collected interaction data may be provided to the interaction data storage unit, and may be synchronized and stored in the interaction data storage unit. The interaction data collected for each user may differ in the time collected depending on the environmental condition of each user. In the method for interaction analysis according to this embodiment, each interaction data collected from the plurality of users may be stored with the time being synchronized by referring to an NTP server. The times of the interaction data collected for each user are consistent, which allows comparison and analysis of the interaction occurring between the users. The interaction data may be stored for each user, and may be subdivided and stored according to the type of interaction data.

Subsequently, an analysis mode of the stored interaction data is provided (S120).

The interaction data analysis unit may execute an applied program that provides the analysis mode, and provide it to the manager or developer. The interaction data analysis unit may load the interaction data for analysis from the interaction data storage unit, and provide an analysis mode for analysis of the stored interaction data, but is not limited thereto, and may also provide an analysis mode in which the interaction data collected by the interaction data collection unit may be monitored and analyzed in real time. For example, an evaluation mode may be provided in which evaluation is performed on the currently collected interaction data with respect to a reference value preset for each item.

The analysis mode may include a basic mode, a query mode and a statistics mode. The basic mode may be a basic display on which the loaded interaction data is displayed to the manager. The type of interaction data displayed in the basic mode may be preset by the manager that performs analysis, and the manager may arbitrarily adjust the type of data displayed. The query mode is provided in which the manager searches for interaction data in a specific condition. That is, the manager may query only interaction data satisfying the specific condition through the query mode. The statistics mode provides statistical analysis based on interaction data. That is, the manager may perform statistical analysis of interaction data through the statistics mode.

Additionally, the step (S120) of providing the analysis mode may further provide an evaluation mode in which evaluation of the virtual content provided in virtual space is performed based on the collected interaction data. For example, the evaluation mode may be provided in which evaluation is performed on the currently collected interaction data with respect to a reference value preset for each item. Additionally, the evaluation mode may include evaluation of accuracy and user suitability of the interaction type and whether or not the interaction type reflects user preference.

The method for interaction analysis of virtual space according to an embodiment of the present disclosure may provide an easy analysis through a tool that can collect and analyze various interactions occurring in virtual space. Additionally, feedback information about the virtual space based on the analyzed data may be generated, and accordingly, the method for interaction analysis of virtual space according to an embodiment of the present disclosure may be actively used in the research and development of user interfaces of virtual space.

The operation by the method for interaction analysis of virtual space according to the embodiments as described above may be implemented as a computer program and recorded on computer-readable recording media at least in part. The computer-readable recording media having recorded thereon the program for implementing the operation by the method for interaction analysis of virtual space according to the embodiments includes any type of recording device in which computer-readable data is stored. Examples of the computer-readable recording media include ROM, RAM, CD-ROM, magnetic tape, floppy disk and optical data storing devices. Additionally, the computer-readable recording media is distributed over computer systems connected via a network so that computer-readable codes may be stored and executed in distributed manner. Additionally, functional programs, codes and code segments for realizing this embodiment will be easily understood by those having ordinary skill in the technical field to which this embodiment belongs.

The present disclosure has been hereinabove described with reference to the embodiments, but the present disclosure should not be interpreted as being limited to these embodiments or drawings, and it will be apparent to those skilled in the corresponding technical field that various modifications and changes may be made thereto without departing from the spirit and scope of the present disclosure set forth in the appended claims.

What is claimed is:

1. A system for interaction analysis of virtual space, comprising:
   an interaction data collection unit which collects interaction data of at least one user participating in a virtual space in which virtual content is implemented, the virtual space being a graphical representation, displayed to a user, of a space;
   an interaction data storage unit which synchronizes and stores the collected interaction data; and
   an interaction data analysis unit which provides an analysis mode of the interaction data,
   wherein the user participates in the virtual space using at least one virtual object displayed to the user, the virtual object controlled based on a physical movement of a part of the at least one user,
   wherein the interaction data includes a real image of the part of the at least one user and a virtual space image including the virtual object,
   wherein each frame of the real image is paired with a corresponding frame of the virtual space image, and
   wherein the interaction data includes, for each pair of a frame of the real image and a corresponding frame of the virtual space image, an interaction type identifier that classifies an action of the part of the at least one user as a particular interaction type of an interaction of the virtual object with the virtual content, and a confidence level value that numerically represents a level of confidence that the particular interaction type accurately represents an interaction type of the real image of the part of the at least one user.

2. The system for interaction analysis of virtual space according to claim 1, wherein the interaction data includes a timestamp and a frame index.

3. The system for interaction analysis of virtual space according to claim 2, wherein the interaction data further includes a user manipulation method, hand information, virtual object information, and interaction information with another user.

4. The system for interaction analysis of virtual space according to claim 1, wherein the interaction data is collected in real time or for a set predetermined period of time.

5. The system for interaction analysis of virtual space according to claim 1, wherein the collected interaction data is stored with the time being synchronized by referring to a Network Time Protocol (NTP) server.

6. The system for interaction analysis of virtual space according to claim 1, wherein the analysis mode includes a basic mode, a query mode and a statistics mode.

7. The system for interaction analysis of virtual space according to claim 1, wherein the interaction data analysis unit further provides an evaluation mode in which evaluation of the virtual content is performed based on the collected interaction data.

8. A method for interaction analysis of virtual space, comprising:
   collecting interaction data of at least one user participating in a virtual space in which virtual content is implemented, the virtual space being a graphical representation, displayed to a user, of a space;
   synchronizing and storing the collected interaction data; and
   providing an analysis mode of the interaction data;
   wherein the user participates in the virtual space using at least one virtual object displayed to the user, the virtual object controlled based on a physical movement of a part of the at least one user,
   wherein the interaction data includes a real image of the part of the at least one user and a virtual space image including the virtual object,
   wherein the analysis mode of the interaction data includes pairing each frame of the real image with a corresponding frame of the virtual space image, and
   wherein the interaction data includes, for each pair of a frame of the real image and a corresponding frame of the virtual space image, an interaction type identifier that classifies an action of the part of the at least one user as a particular interaction type of an interaction of the virtual object with the virtual content, and a confidence level value that numerically represents a level of confidence that the particular interaction type accurately represents an interaction type of the real image of the part of the at least one user.

9. The method for interaction analysis of virtual space according to claim 8, wherein the interaction data includes a timestamp and a frame index.

10. The method for interaction analysis of virtual space according to claim 9, wherein the interaction data further includes a user manipulation method, hand information, virtual object information and interaction information with another user.

11. The method for interaction analysis of virtual space according to claim 8, wherein the interaction data is collected in real time or for a set predetermined period of time.

12. The method for interaction analysis of virtual space according to claim 8, wherein the collected interaction data is stored with the time being synchronized by referring to a Network Time Protocol (NTP) server.

13. The method for interaction analysis of virtual space according to claim 8, wherein the analysis mode includes a basic mode, a query mode and a statistics mode.

14. The method for interaction analysis of virtual space according to claim 8, wherein the providing the analysis mode includes further providing an evaluation mode in which evaluation of the virtual content is performed based on the collected interaction data.

* * * * *